United States Patent [19]

Nishikawa et al.

[11] Patent Number: 5,446,092
[45] Date of Patent: Aug. 29, 1995

[54] THERMOPLASTIC POLYMER COMPOSITION

[75] Inventors: Makoto Nishikawa, Hasaki; Yoshio Hirayama, Azuma; Shiroh Kishii, Kashima; Masao Ishii, Kashima, all of Japan

[73] Assignee: Kuraray Co., Ltd., Kurashiki, Japan

[21] Appl. No.: 230,837

[22] Filed: Apr. 21, 1994

[30] Foreign Application Priority Data

Apr. 23, 1993 [JP] Japan .................. 5-120809

[51] Int. Cl.⁶ .................. C08L 53/00; C08L 77/00
[52] U.S. Cl. .................. 525/66; 525/64; 525/92 B; 525/92 C; 525/92 F
[58] Field of Search .................. 525/92, 66

[56] References Cited

U.S. PATENT DOCUMENTS 5,216,074  6/1993  Imai .................. 525/66

FOREIGN PATENT DOCUMENTS

| 0438287 | 7/1991 | European Pat. Off. . |
| 0524765 | 1/1993 | European Pat. Off. . |
| 50-75651 | 6/1975 | Japan . |
| 50-119055 | 9/1975 | Japan . |
| 50-148457 | 11/1975 | Japan . |
| 52-117940 | 10/1977 | Japan . |
| 52-150457 | 12/1977 | Japan . |
| 1-168743 | 7/1989 | Japan . |
| 1-168744 | 7/1989 | Japan . |
| 3-74409 | 3/1991 | Japan . |

*Primary Examiner*—Patricia A. Short
*Attorney, Agent, or Firm*—Oblon, Spivak, McClelland, Maier & Neustadt

[57] ABSTRACT

A thermoplastic polymer composition comprises: a thermoplastic polymer (a) having polarity on the main chain of the molecule thereof, and a modified block copolymer (b) of a block copolymer comprising:

at least one polybutadiene block (B) having a degree of vinylization of not more than 30%, and at least one polymer block (D) comprising units from isoprene and butadiene in a ratio by weight of isoprene/butadiene of 30/70 to 100/0 and having a degree of vinylization of not more than 30%, said polybutadiene block (B) and said polymer block (D) each has a degree of unsaturation of not more than 30%, to said block copolymer a molecular unit containing a carboxyl acid group or derivatives thereof having added, the ratio by weight between said component (a) and said component (b), (a)/(b), being in a range of 2/98 to 98/2.

7 Claims, No Drawings

THERMOPLASTIC POLYMER COMPOSITION

BACKGROUND OF THE INVENTION

1. Field of the Invention

The present invention relates to a thermoplastic polymer composition and, more specifically, to a thermoplastic polymer composition comprising a thermoplastic polymer having polarity on the main chain thereof and a modified block copolymer to which a carboxylic acid group or derivatives thereof has added, the composition having excellent mechanical characteristics with the two components having improved compatibility.

2. Description of the Related Art

Polymeric substances have been widely used as materials for fibers, films, sheets and like shaped articles, and it sometimes happens that these substances, when used alone, do not sufficiently meet the intended purpose. A variety of attempts have therefore been made to combine a polymeric substance with other components to form compositions or laminates, thereby providing the resulting products with sufficient strength, improved processability, reduced cost or like advantages. However, different types of polymeric substances, when combined together to form a composition, seldom have good compatibility with each other. As a result, most of compositions comprising different types of polymeric substances with poor compatibility have problems in achieving the intended improvements due to non-uniformity, inter-layer delamination between the different polymer layers or like troubles resulting from the poor compatibility.

It is known, in order to obtain compositions having good properties by blending different polymeric substances, to use as one component a block copolymer comprising a polystyrene block and a polybutadiene block, one comprising a polystyrene block and a polyisoprene block, or a hydrogenated block copolymer obtained by partially hydrogenating the foregoing (for example, Japanese Patent Application Laid-open Nos. 119055/1975, 148457/1975, 75651/1975, 117940/1977 and 150457/1977). However, these block copolymers cannot be said to be useful for improving the characteristics of thermoplastic polymers having polarity on their main chain, such as polyamides, thermoplastic polyesters and thermoplastic polyurethanes, because of markedly poor compatibility with these polymers.

There are known compositions capable of modifying polyamides, thermoplastic polyesters, thermoplastic polyurethanes and the like, incorporating into these thermoplastic polymers a block copolymer obtained by permitting a carboxylic acid or derivatives thereof to add to a partially hydrogenated product of a block copolymer comprising an aromatic vinyl compound polymer block and a conjugated diene compound polymer block (for example, U.S. Pat. Nos. 4,174,358, 4,628,072, 4,659,970, 4,820,768 and 4,972,020). However, although these compositions, with an improved compatibility of the thermoplastic polymers with themselves, exhibit relatively better mechanical properties, they have poor resistance to shock at low temperatures and have some problem with respect to oil resistance..

There are compositions incorporating a thermoplastic polymer such as polyamides, polyethylene terephthalate or polybutylene terephthalate and a block copolymer obtained by permitting a carboxylic acid or derivatives thereof to add to a partially hydrogenated product of a block copolymer having a structure of X-Y-X or X-Y-X-Y, wherein X and Y represent a polybutadiene block having a degree of vinylization of not more than 20% and one having a degree of vinylization of 30 to 95%, respectively (Japanese Patent Application Laid-open No. 74409/1991). The compositions still have the drawback of poor impact strength at low temperatures, while eliminating the problem of poor oil resistance though.

SUMMARY OF THE INVENTION

Accordingly, an object of the present invention is to provide a thermoplastic polymer composition having excellent mechanical properties, in particular impact strength, more specifically that at low temperatures, as well as excellent oil resistance, by improving the compatibility of the thermoplastic polymer and a hydrogenated block copolymer with each other.

The present inventors have found that a block copolymer having a specific structure is effective in achieving the object, to complete the invention.

Thus, the present invention provides a thermoplastic polymer composition comprising: a thermoplastic polymer (a) having polarity on the main chain of the molecule thereof, and a modified block copolymer (b) of a block copolymer comprising:

at least one polybutadiene block (B) having a degree of vinylization of not more than 30%, and at least one polymer block (D) comprising units from isoprene and butadiene in a ratio by weight of isoprene/butadiene of 30/70 to 100/0 and having a degree of vinylization of not more than 30%, said polybutadiene block (B) and said polymer block (D) each has a degree of unsaturation of not more than 30%, to said block copolymer a molecular unit containing a carboxyl acid group or derivatives thereof having added, the ratio by weight between said component (a) and said component (b), (a)/(b), being in a range of 2/98 to 98/2.

DETAILED DESCRIPTION OF THE PREFERRED EMBODIMENTS

The modified block copolymer used as component (b) in the present invention is produced for example as follows. There is hydrogenated a block copolymer comprising at least one polybutadiene block (B) having a degree of vinylization of not more than 30%, and at least one polymer block (D) comprising units from isoprene and butadiene in a ratio by weight of isoprene/butadiene of 30/70 to 100/0 and having a degree of vinylization of not more than 30%. A carboxylic acid or derivatives thereof is then permitted to add to the obtained hydrogenated product, to obtain the modified block copolymer.

The above block copolymer before being hydrogenated contains at least one, preferably at least 2 polybutadiene block (B) and at least one polymer block (D).

In the block copolymer before being hydrogenated, where polymer block (D) contains a butadiene component in addition to an isoprene component, the polymer block is obtained by polymerizing a mixture of isoprene and butadiene.

In the block copolymer, the ratio by weight between polybutadiene block (B) and polymer block (D) is preferably in a range of 10/90 to 90/10, more preferably in a range of 20/80 to 85/15.

The polybutadiene block (B) has a degree of vinylization of not more than 30%, preferably not more than 20%. If the polybutadiene block (B) has an degree of vinylization exceeding 30%, the block will have poor crystallinity, thereby decreasing the oil resistance of the resulting composition.

It is necessary that the polymer block (D) contain isoprene units-in an amount of at least 30% by weight. If the content of isoprene units is less than 30% by weight, the block will have poor low temperature characteristics. It is also necessary that the polymer block (D) have a degree of vinylization of not more than 30%. If the degree of vinylization of polymer block (D) is less than 30%, the block will have a high glass transition point, thereby becoming inferior in low temperature characteristics.

It is desirable that the above block copolymer have a number average molecular weight in a range of 20,000 to 500,000 and a molecular weight distribution in terms of a ratio between the weight average molecular weight and the number average molecular weight of 1.05 to 10. The block copolymer may have any structure, such as linear, branched, radial, or combinations of the foregoing.

Representative examples of structures possessed by the block copolymer are (B-I)n, (B-I)n-B, [B-(I/B)]n,[B-(I/B]n-B (n: an integer of ]to 5), (B-I)-X and [B-(I/B)]-X (X: 3- to 10-multifunctional coupling agent residue), wherein B, I and (I/B) represent, respectively, a polybutadiene block having a degree of vinylization of not more than 30%, an isoprene block having a degree of vinylization of not more than 30% and a polymer block obtained by polymerizing a mixture of isoprene and butadiene in such a manner that the resulting degree of vinylization becomes not more than 30%.

Where the block copolymer contains at least 2 polybutadiene blocks (B), these blocks may either have the same structure or be different in the molecular weight, molecular weight distribution, microstructure or like structures. Likewise, when the block copolymer contains at least 2 polymer blocks (D), these blocks may either have the same structure or be different in the mixing ratio of isoprene/butadiene, molecular weight, molecular weight distribution, microstructure or like structures.

The above block copolyer is generally obtained by subjecting monomers including butadiene and isoprene to successive anionic polymerization in a solvent of inactive hydrocarbon solvent such as benzene, toluene, hexane or cyclohexane and with a catalyst of an organolithium compound such as lithium butyl. It is also possible to react the block copolymer having a lithium-active terminal obtained during the above process with a multi-functional coupling agent such as carbon tetrachloride or silicon tetrachloride, to obtain a branched or radial-type block copolymer. In the present invention, those block copolymers that are obtained by other polymerization processes, such as radical polymerization and stereo-regulating polymerization can also be used, as long as they satisfy the above requirements.

The block copolymer is hydrogenated by a known process, such as one described in Japanese Patent Publication No. 8704/1967. It is necessary that, in the block copolymer, both polybutadiene block (B) and polymer block (D) have a degree of unsaturation of not more than 30%, in view of weather resistance and heat resistance.

The degree of unsaturation of a polymer block herein means the content of carbon-carbon double bonds in the polymer block and is determined by instrumental analysis such as nuclear magnetic resonance (NMR) analysis or infrared absorption (IR) spectrometry or chemical analysis such as iodometry.

The hydrogenated block copolymer obtained is then modified by addition of a carboxylic acid or its derivatives. Examples of usable carboxylic acids or their derivatives are maleic acid, maleic anhydride, fumaric acid, itaconic acid, acrylic acid, methacrylic acid, methyl methacrylate, glycidyl methacrylate, crotonic acid, cis-4-cyclohexene-1,2-dicarboxylic acid or its anhydride, endo-cis-bicyclo[2,2,1]-5-heptene-2,3-dicarboxylic acid or its anhydride and maleinimide. Among these compounds, maleic anhydride and glycidyl methacrylate are particularly preferred. These unsaturated carboylic acids may be used singly or in combination of 2 or more.

The addition of a carboxylic acid or its derivatives to the hydrogenated block copolymer can be conducted in a solution or bulk and in the presence or absence of a radical initiator. A preferred process comprises reacting the hydrogenated block copolymer and a carboxylic acid or its derivatives in, for example, an extruder and in the presence of a radical initiator.

There are no specific restrictions with respect to the process for producing the modified block copolymer, but it is not recommended to select such a process as to permit the resulting modified block copolymer to contain undesirable components such as gels in amounts exceeding designated levels or to have a markedly high melt viscosity, which impairs processability. A carboxylic acid may be introduced into one end or both ends of the modified block copolymer by blowing carbon dioxide after completion of the anionic polymerization.

The amount of addition of a carboxylic acid or its derivatives to the hydrogenated block copolymer is preferably 0.01 to 20 parts by weight based on 100 parts by weight of the hydrogenated copolymer, more preferably 0.1 to 10 parts by weight on the same basis. If the addition amount is less than 0.01 part by weight, the obtained modified block copolymer will produce very little effect of improvement by the modification as compared with the block copolymer before modification. On the other hand, the improvement effect hardly further increases with the addition exceeding 20 parts by weight.

The thermoplastic polymer having polarity in the main chain, constituting another component in the composition of the present invention, is now described.

The thermoplastic polymer having polarity in the main chain as referred to in the present invention includes those that can chemically bond to, or induce a strong interaction with, the carboxylic acid or its derivatives having added to the hydrogenated block copolymer. Example of these polymers are thermoplastic polymers containing amido-bonds, ester-bonds or urethane-bonds. Thus, the thermoplastic polymers having polarity in the chain include polyamides, thermoplastic polyesters and thermoplastic polyurethanes, the terminals or side chains of which may be bonded to other functional groups.

Polyamides usable in the present invention are polycondensates of a dicarboxylic acid and a diamine, polycondensates of an α-aminocarboxylic acid, products of ring-opening polymerization of a cyclic lactam and the like, and their concrete examples are nylon-6, nylon-66, nylon-610, nylon-11 and nylon-12, and copolymers of the foregoing, such as nylon-6-nylon-66 copolymer, nylon-6-nylon-12 copolymer and semi-aromatic polyamides as represented by the following structural formula;

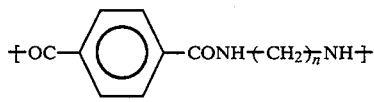

wherein n represents an integer of 2 to 12.

It is desirable that these polyamides have a number average molecular weight and a melting point of 200 to 30,000 and 150° to 270° C. respectively, and more preferably not more than 20,000° and 260° C., respectively, within these ranges, to obtain compositions having excellent processability.

These polyamides may be used singly or in combination of 2 or more.

Polyesters usable in the present invention should be thermoplastic. Polyesters contain in the molecules thereof ester-bonds and representative polyesters have a structure of polycondensates of a dicarboxylic acid and a glycol (or diol). These polyesters are obtained by polycondensation of a dicarboxylic acid, lower alkyl esters thereof, acid hydrides thereof or acid anhydrides thereof, with a glycol. Examples of aromatic or aliphatic dicarboxylic acids usable for this purpose are oxalic acid, malonic acid, succinic acid, glutaric acid, pimelic acid, suberic acid, adipic acid, sebacic acid, azelaic acid, 1,9-nonanedicarboxylic acid, 1,10-decanedicarboxylic acid, 1,16-hexadecanedicarboxylic acid, terephthalic acid, isophthalic acid, p,p'-dicarboxydiphenyl, p-carboxyphenoxyacetic acid and 2,6-naphthalenedicarboxylic acid. These dicarboxylic acids can also be used in optional combinations. Among these, terephthalic acid and isophthalic acid are particularly preferred.

Glycols (or diols) usable as another starting material for the above polyesters includes aliphatic and aromatic ones and their examples are ethylene glycol, 1,3-propanediol, 1,2-propanediol, 1,4-butanediol, 1,6-hexanediol, 1,4-cyclohexanediol, 1,9-nonanediol, 1,10-decanediol, neopentyl glycol and p-xylene glycol. These glicols may be used singly or in any optional combination. Among these, ethylene glycol, 1,4-butanediol and 1,9-nonanediol are particularly preferred. Among polyesters comprising dicarboxylic acid units and glycol units, polyethylene terephthalate and polybutylene terephthalate are useful, part of monomer units of which may be replaced by other monomer units.

These polyesters preferably has a molecular weight of 500 to 100,000, more preferably 5,000 to 50,000.

These polyesters may be obtained by any polymerization process with no specific restrictions. Thus, the above acid component, e.g. terephthalic acid, isophthalic acid, an aliphatic dicarboxylic acid, or ester-forming derivatives of the foregoing can, together with one of the glycols, at the same time or successively, be subjected to direct esterification or transesterification, followed by polymerization. On this occasion, a conventional, optional catalyst, stabilizer, modifying agent and other additives may be used.

As other useful polyesters, polylactones obtained by ring-opening polymerization of a cyclic lactone, such as pivalolactone, β-propiolactone or ε-caprolactone.

These polyesters have hydroxyl groups or carboxylic groups at the molecular terminals thereof, which may further be reacted with a monofunctional alcohol or carboxylic acid for deactivation. The polyester used in the present invention preferably has at part or all of its molecular terminals functional groups capable of reacting with the functional group of the modified block copolymer used. Use of a polyester having this type functional groups markedly improves the compatibility of the resulting composition by undergoing reaction, partially, with the modified block copolymer.

The above polyesters can be used either singly or in combination of 2 or more.

The thermoplastic polyesters useful in the present invention include, not only those used for preparing fibers, films and resins, such as polyethylene terephthalate, but also polybutylene terephthalate and polyethylene naphthalate and those having a lower melting point and lower crystallinity than the foregoing, as well as polyetherester block polymers having hard segments and soft segments in one and the same molecule.

Thermoplastic polyurethanes usable in the present invention are classified, according to their synthesis conditions, into completely thermoplastic type and incompletely thermoplastic type, which are determined by the molar ratio between the OH groups in the starting material di-functional polyol or glycol and the NCO groups in the isocyanate. That is, those having been synthesized under the conditions of about $0.95 < NCO/OH \leq 1.1$ belong to completely thermoplastic type, while those under about $1.1 < NCO/OH$ to incompletely thermoplastic type. These thermoplastic polyurethanes include ones having soft segments of a polyol (polyester or polyether) and a diisocyanate and hard segments of a diisocyanate and a glycol.

Examples of usable starting material polyester diols are poly(1,4-butylene adipate), poly(1,6-hexane adipate add polycaprolactone, and examples of usable starting material polyether diols are polyethylene glycol, polypropylene glycol and polyoxytetramethylene glycol. Examples of glycols are ethylene glycol, 1,4-butanediol and 1,6-hexanediol. Usable glycols include aromatic, alicyclic and aliphatic ones and their examples are tolylene diisocyanate, 4,4-diphenylmethane diisocyanate, hexamethylene diisocyanate and isophorone diisocyanate.

Besides the above thermoplastic polyurethanes, polyurethanes used for adhesives, foams, paints and the like are also usable in the present invention, as long as they have sufficient compatibility with the modified block copolymer, which is component (b) in the present invention.

These thermoplastic polyurethanes preferably have a molecular weight of 5,000 to 500,000, more preferably 10,000 to 300,000, in view of mechanical properties.

The features of the thermoplastic polymer composition of the present invention is described next.

The compositions of the present invention, utilizing as their component a hydrogenated block copolymer modified by a carboxylic acid or its derivatives, has the feature of having markedly improved compatibility with polar thermoplastic polymers, as compared with hydrogenated block copolymers unmodified.

That is, while compositions comprising an unmodified hydrogeneated block copolymer and a polar thermoplastic polymer, the two components having poor compatibility, have poor dispersibility and become opaque when the two components have different refractivities, the compositions of the present invention comprising a modified hydrogenated block copolymer and a polar thermoplastic polymer have good dispersibility and improved transparency, as well as good mechanical properties.

The compositions of the presen invention can exhibit a variety of mechanical properties according to the ratio between the modified hydrogenated block copolymer and polar thermoplastic polymer used, from rubber- or leather-like to solid resin-like. With a prevailing content of the modified hydrogenated copolymer, there is obtained a rubber- or leather-like composition having higher hardness and tensile strength and better resistance to oil and heat than those of conventional compositions comprising polystyrene block and polybutadiene block or compositions comprising polystyrene block and polyolefin block. As the content of the thermoplastic polymer increases, the resulting compositions become of tougher nature like solid resins and exhibit marked effect of improving shock resistance, adhesiveness and resistance to folding, the degree of improvement varying according to the type of the polar thermoplastic polymer used though.

The modified block copolymers used in the present invention, its degree of unsaturation being specified as net exceeding 30%, exhibit excellent resistance to weather and heat.

In the compositions of the present invention, the thermoplastic polymer (a) and the modified block copolymer (b) is used in a ratio by weight of (a)/(b) of 2/98 to 98/2, preferably 5/95 to 95/5. Too small a content of component (a) produces little effect as a rubber-like composition, while too large a content of (a) produces little effect as a solid resin.

In particular, compositions obtained by using a polar thermoplastic polymer (a) and a modified block copolymer (b) in a ratio by weight of (a)/(b) of 2-50/98-50 are useful as those having improved the modified block copolymer, and compositions with an (a)/(b) of 98-50/2-50 are useful as those having improved the properties, in particular shock resistance, of the polar thermoplastic polymer.

The compositions of the present invention may contain as part of their components a graft copolymer comprising the modified block copolymer and polar thermoplastic polymer and formed by reaction of reactive groups contained in the modified block copolymer and those contained in the polar thermoplastic polymer used.

The modified block copolymers used in the present invention can be suitably used as agents for improving the compatibility of thermoplastic polymer having polarity in the main chain with polyolefin-based thermoplastic polymers such as polypropylene and polyethylene.

The compositions of the present invention can be prepared, according to the ratio of the contents of their components, with conventional apparatuses for mixing the usual polymers.

For example, the mixing is conducted through an extruder, mixing roll, Banbary mixer or kneader, and melt blending through an extruder is particularly preferred in the present invention.

The thermoplastic polymer compositions of the present invention can incorporate, within amounts not to impair the properties, reinforcing agents and/or fillers, e.g. calcium carbonate, silica, carbon black, glass fibers and clay, as well as plasticizers, e.g. polyethylene glycol and phthalic acid esters. Further other additives, e.g. a heat stabilizer, antioxidant, UV-absorber, colorant, pigment and releasing agent can be added, and it is also possible to add a foaming agent to the compositions of the present invention to make them foamed bodies.

The thermoplastic polymer compositions of the present invention can be molded by any one of known process, e.g. extrusion molding, injection molding, tubular film process, compression molding, vacuum molding and calendering, into sheets, films or other various shaped articles. The polymer compositions can also be formed into nonwovens or like fibrous articles by melt blowing, spunbonding process or like methods. Examples of concrete items of these finished goods are interior and exterior parts of automobiles, such as hamper and inside panels; housing of household-use electric appliances such as TV, stereophonic gramophones and vacuum cleaner; electrical and electronic parts such as connector; materials for electric cables; food packaging materials and food containers, such as trays for meat and fresh fish and packing materials for fruits and vegetables; packing materials for industrial goods; sports goods, such as sport shoes; clothing and leather products; daily-use sundries, such as toys and sandals; various films, sheets and laminates; adhesives and tacky adhesives; elastic materials used for disposable diapers and the like; various rubber products, such as hoses, tubes and belts and medical care products. The polymer compositions are thus useful for a markedly wide range of end-uses.

Other features of the invention will become apparent in the course of the following descriptions of exemplary embodiments which are given for illustration of the invention and are not intended to be limiting thereof.

EXAMPLES

Reference Example

[Preparation of modified hydrogenated block copolymers]

1. Polymerization for block copolymers and hydrogenation thereof 1-(1)

A tri-block copolymer having a structure of butadiene-isoprene-butadiene was obtained, in a solvent of cyclohexane and with a polymerization catalyst of lithium n-butyl, by feeding successively butadiene, isoprene and finally butadiene.

The block copolymer obtained was hydrogenated with mixed catalyst of cobalt naphthenate and aluminum triethyl under a hydrogen pressure of 10 kg/cm$^2$, into a hydrogenated block copolymer having a hydrogenation ratio of 95%. This polymer was named R-1.

1-(2)

A hydrogenated butadiene-isoprene di-block copolymer having a hydrogenation ratio of 96% was obtained in the same manner as in 1-(1). This polymer was named R-2.

1-(3)

A hydrogenated butadiene-isoprene/butadiene mixture-butadine tri-block copolymer having a hydrogenation ratio of 96% was obtained in the same manner as in 1-(1). This polymer was named R-3.

1-(4)

A hydrogenated styrene-isoprene-styrene tri-block copolymer having a hydrogenation ratio of 96% was obtained in the same manner as in 1-(1). This polymer was named R-4.

1-(5)

Butadiene was polymerized in a cyclohexane solvent with a polymerization catalyst of lithium n-butyl. Then, tetrahydrofuran was added as a vinylization agent, to polymerize butadiene, to obtain a butadiene-vinyl butadiene copolymer. The copolymer had a degree of vinylization of vinyl butadiene part of 60%. The polymer was hydrogenated to give a hydrogenated block copolymer having a hydrogenation ratio of 98%. This polymer was named R-5.

Table 1 shows the properties of these 5 copolymers.

TABLE 1

| Type | Structure | Number average molecular weight | Content of 3,4-butadiene block (wt %) | Amount of 1,2-bonds in 3,4-butadiene block (mole %) | Content of styrene block (wt %) | Amount of 1,2-bonds in 1,2-butadiene block (mole %) | Degree of hydrogenation (%) | Mixing ratio of isoprene/butadiene (wt %) |
|---|---|---|---|---|---|---|---|---|
| R-1 | B-I-B | 45,000 | 30 | 7 | — | — | 95 | — |
| R-2 | B-I | 78,000 | 20 | 7 | — | — | 96 | — |
| R-3 | B-(I/B)-B | 128,000 | 30 | 7 | — | — | 96 | 60/40 |
| R-4 | S-I-S | 45,000 | — | — | 30 | — | 96 | — |
| R-5 | B-VB | 70,000 | 30 | 7 | — | 60 | 98 | — |

2. Modification of hydrogenated block copolymers 2-(1) Modification with maleic anhydride (MAH)

To 100 parts by weight of the hydrogenated block copolymer (R-1) obtained in 1-(1), there were added 2 parts by weight of maleic anhydride and 0.2 part by weight of a dialkyl peroxide (PERHEXA 25B, made by Nippon Oil & Fats Co., Ltd.) and the obtained mixture was fed to a twin-screw extruder (screw diameter: 35 mm, L/D=30) under an atmosphere of nitrogen and reacted at a cylinder temperature of 230° C., while unreacted maleic anhydride was being removed by vent-suction.

The modified hydrogenated block copolymer had a maleic anhydride addition content of 1.7% by weight/polymer.

2-(2) Modification with glycidyl methacrylate (GMA)

To 100 parts by weight of the hydrogenated block copolymer (R-2) obtained in 1-(2), there were added 1 part by weight of glycidyl methacrylate and 0.15 part by weight of PERHEXA 25B (made by Nippon Oil & Fats Co., Ltd.) and the obtained mixture was subjected to modification reaction in the same manner as in 2-(1).

The modified hydrogenated block copolymer had a GMA addition content of 0.6% by weight/polymer.

2-(3) Modification with maleic anhydride (MAH)

To 100 parts by weight of the hydrogenated block copolymer (R-3) obtained in 1-(3), there were added 3 parts by weight of maleic anhydride and 0.3 part by weight of PERHEXA 25B (made by Nippon Oil & Fats Co., Ltd.) and the obtained mixture was subjected to modification reaction in the same manner as in 2-(1).

The modified hydrogenated block copolymer had a maleic anhydride addition content of 2.5% by weight/polymer.

2-(4) Modification with maleic anhydride (MAH)

To 100 parts by weight of the styrene-based hydrogenated block copolymer (R-4) obtained in 1-(3), there were added 3 parts by weight of maleic anhydride and 0.3 part by weight of PERHEXA 25B (made by Nippon Oil & Fats Co., Ltd.) and the obtained mixture was subjected to modification reaction in the same manner as in 2-(1).

The modified hydrogenated block copolymer had a maleic anhydride addition content of 2.3% by weight/polymer.

2-(5) Modification with glycidyl methacrylate (GMA)

To 100 parts by weight of the styrene-based hydrogenated block copolymer (R-4) obtained in ]-(4), there were added 1.5 parts by weight of glycidyl methacrylate (GMA) and 0.2 part by weight of PERHEXA 25B (made by Nippon Oil & Fats Co., Ltd.) and the obtained mixture was subjected to modification reaction in the same manner as in 2-(]).

The modified hydrogenated block copolymer had a GMA addition content of 0.7% by weight/polymer.

2-(6) Modification with maleic anhydride (MAH)

To 100 parts by weight of the hydrogenated butadiene-vinyl butadiene block copolymer (R-5) obtained in 1-(5), there were added 3 parts by weight of maleic anhydride and 0.3 part by weight of PERHEXA 25B (made by Nippon Oil & Fats Co., Ltd.) and the obtained mixture was subjected to modification reaction in the same manner as in 2-(1).

The modified hydrogenated block copolymer had a maleic anhydride addition content of 2.6% by weight/polymer.

The modified hydrogenated block copolymers obtained in the above 2-(1) through (6) were named M-1, G-2, M-3, M-4, G-4 and M-5, respectively. Table 2 shows the amounts of modification of these copolymers.

TABLE 2

| Name | Block copolymer used | Amount of modification with MAH (wt %) | Amount of modification with GMA (wt %) |
|---|---|---|---|
| M-1 | R-1 | 1.7 | — |
| G-2 | R-2 | — | 0.6 |
| M-3 | R-3 | 2.5 | — |
| M-4 | R-4 | 2.3 | — |
| G-4 | R-4 | — | 0.7 |
| M-5 | R-5 | 2.6 | — |

MAH: maleic anhydride; GMA: glycidyl methacrylate.

Example 1 and Comparative Examples 1 through 4

There were pre-mixed 80 parts by weight of a sufficiently dried nylon-66 (PA66) (AMIRAN CM3001N, made by Toray Industries, Inc.) and 20 parts by weight of the modified hydrogenated block copolymer (M-1), modified styrene-based hydrogenated block copolymer (M-4) or unmodified hydrogenated block copolymer (R-1). The obtained mixtures were each melt blended through a twin-screw extruder under an atmosphere of nitrogen and at a temperature of 270° C.

The pellets of compositions obtained were injection molded into test specimens. The specimens were tested for bending modulus, notched Izod impact strengths at 25° C. and −25° C. and weight reduction by extraction with toluene. The results are shown in Table 3. It is apparent from Table 3 that composition using the modified hydrogenated block copolymer (M-1) had better stiffness, oil resistance and shock resistance compared with Comparative Examples 1 through 4, thus proving the marked improvement achieved by addition of the modified hydrogenated block copolymer.

Example 2 and Comparative Examples 5 through 7

There were premixed 80 parts by weight of a sufficiently dried polybutylene terephthalate (PBT) (KS203F, made by Kuraray) and 20 parts by weight of the modified hydrogenated block copolymer (G-2), modified styrene-based hydrogenated block copolymer (G-4) or unmodified hydrogenated block copolymer (R-2). The obtained mixtures were melt blended in the same manner as in Example ]and evaluation was made in the same manner. The results are also shown in Table 3.

The shaped article obtained from the melt blend showed an Izod impact strength at 25° C. of 16 kg. cm/cm, thus having improved the shock resistance to a large extent compared to PBT alone, while maintaining rigidity and oil resistance at good levels.

Example 4

Melt blending was conducted with 80 parts by weight of a commercially available polyurethane (KURAMIRON 9190, made by Kuraray Co., Ltd.) and 20 parts by weight of the modified hydrogenated block copolymer (M-3) in the same manner as in Example 1 and injection molded specimens were obtained in the same manner.

The specimens show a retention of tensile strength after being immersed in hot water at 100° C. for 3 days of 78%, which was a marked improvement over 62% with the polyurethane alone.

Obviously, numerous modifications and variations of the invention are possible in light of the above teachings. It is therefore to be understood that within the scope of the appended claims, the invention may be practiced otherwise than as specifically described herein.

TABLE 3

|  | Example 1 | Example 2 | Example 3 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|
| Formulation (wt. ratio) | | | | | | | | | | |
| PA66 | 80 | — | — | 100 | 80 | 80 | 80 | — | — | — |
| PBT | — | 80 | 70 | — | — | — | — | 100 | 80 | 80 |
| PP | — | — | 20 | — | — | — | — | — | — | — |
| M-1 | 20 | — | — | — | — | — | — | — | — | — |
| R-1 | — | — | — | — | 20 | — | — | — | — | — |
| G-2 | — | 20 | 10 | — | — | — | — | — | — | — |
| R-2 | — | — | — | — | — | — | — | — | 20 | — |
| M-4 | — | — | — | — | — | 20 | — | — | — | — |
| M-5 | — | — | — | — | — | — | 20 | — | — | — |
| G-4 | — | — | — | — | — | — | — | — | — | 20 |
| Properties of shaped article | | | | | | | | | | |
| Rigidity (kg/cm²) | 16,800 | 15,000 | 20,000 | 25,600 | 16,800 | 16,000 | 16,200 | 22,000 | 14,500 | 14,700 |
| Shock resistance (kg · cm/cm) | | | | | | | | | | |
| 25° C. | 35 | 42 | 16 | 4.8 | 4.8 | 34 | 34 | 3.4 | 3.4 | 40 |
| −25° C. | 35 | 38 | — | 4.0 | — | 6.0 | 10 | 3.0 | — | 3.5 |
| Oil resistance | good | good | good | good | good | poor | good | good | good | poor |

① Rigidity: Bending modulus;
② Shock resistance: Notched Izod impact strength
③ Oil resistance: Pulverized specimen was immersed in toluene tor 24 hours and measured for weight reduction. good: no weight reduction; poor: some weight reduction As is apparent from Table 3, that in this test also composition according to the present invention had better rigidity, oil resistance and shock resistance compared with Comparative Examples 5 through 7, thus proving the marked improvement achieved by addition of the modified hydrogenated block copolymer.

Example 3

There were premixed 70 parts by weight of a dried PBT (KS203F, made by Kuraray), 20 parts by weight of a PP (NOBLENE MA-3, made by Mitsubishi Petrochemical Co., Ltd.) and 10 parts by weight of the modified hydrogenated block copolymer (G-2). The obtained mixture was melt blended in the same manner as in Example 1 and evaluation was made in the same manner. The results are also shown in Table 3.

What is claimed is:

1. A thermoplastic polymer composition comprising a thermoplastic polyamide (a), and
a modified block copolymer (b) of a block copolymer consisting essentially of units of the structure (B-I)n, (B-I)n-B, [B-(I/B)]n, [B-(I/B)]n-B, wherein n is an integer of 1 to 5, (B-I)-X or [B-(I/B)]-X, wherein X is a 3- to 10-multifunctional coupling agent residue, wherein B, I and (I/B) represent, respectively, a polybutadiene block having a degree of vinylization and a degree of unsaturation of not more than 30%, an isoprene block having a degree of vinylization and a degree of unsaturation of not more than 30%, and a polymer block obtained by polymerizing a mixture of isoprene and butadiene in such a manner that the resulting degree of vinylization and degree of unsaturation is not more than 30%, said block copolymer having added and reacted therewith a molecular unit containing a carboxyl acid group or derivatives thereof, the ratio by weight between said component (a) and said component (b), (a)/(b), being in the range of 2/98 to 98/2.

2. The thermoplastic polymer composition according to claim 1, wherein the ratio by weight between said block B and said blocks I or I/B in said modified block copolymer (b) is in the range of 10/90 to 90/10.

3. The thermoplastic polymer composition according to claim 2, wherein the ratio by weight between said block B and said blocks I or I/B in said modified block copolymer (b) is in the range of 20/80 to 85/15.

4. The thermoplastic polymer composition according to claim 1, wherein said modified block copolymer (b) has a molecular weight of 20,000 to 500,000.

5. The thermoplastic polymer composition according to claim 1, wherein said block copolymer (b) has an amount of addition of said carboxylic acid or derivatives of 0.01 to 20 parts by weight based on 100 parts by weight of said block copolymer (b) before the addition.

6. The thermoplastic polymer composition according to claim 1, wherein the ratio by weight between said thermoplastic polyamide (a) and said modified block copolymer (b) is in the range of 10/90 to 90/10.

7. The thermoplastic polymer composition according to claim 6, wherein the ratio by weight between said thermoplastic polymer (a) and said modified block copolymer (b) is in the range of 20/80 to 85/15.

* * * * *